June 5, 1934.  J. BIJUR  1,961,190
LUBRICATION
Filed Jan. 6, 1931  3 Sheets-Sheet 3
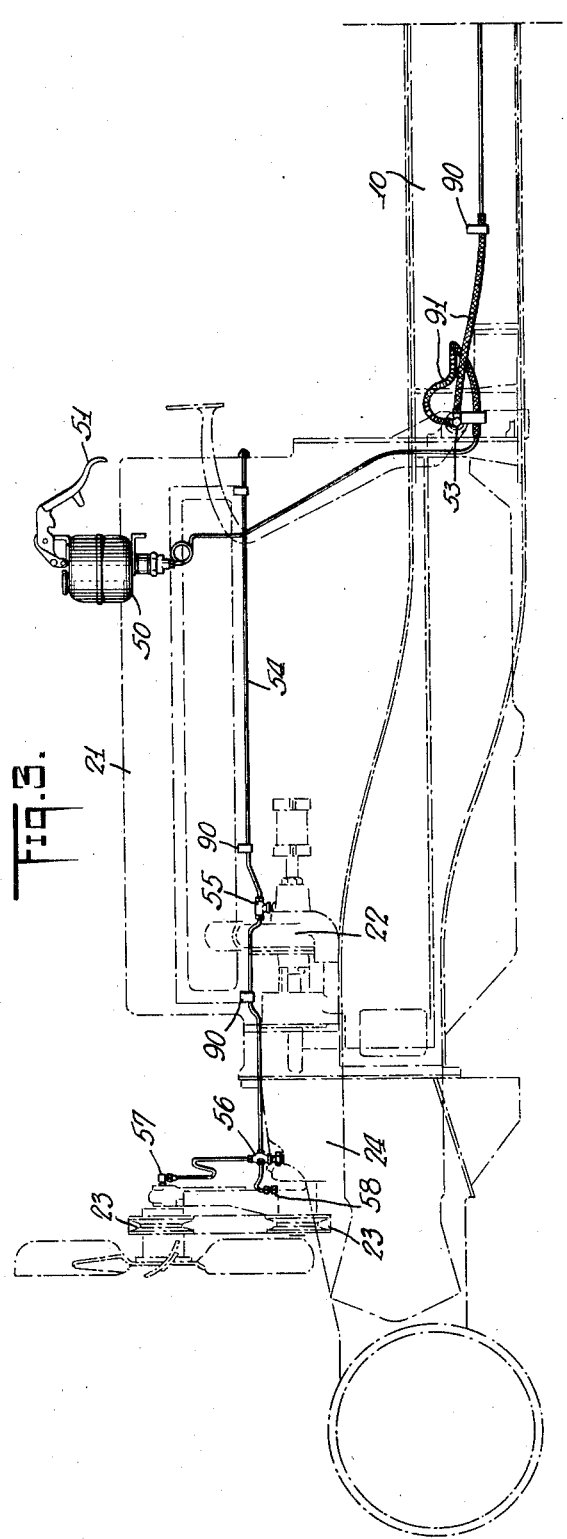
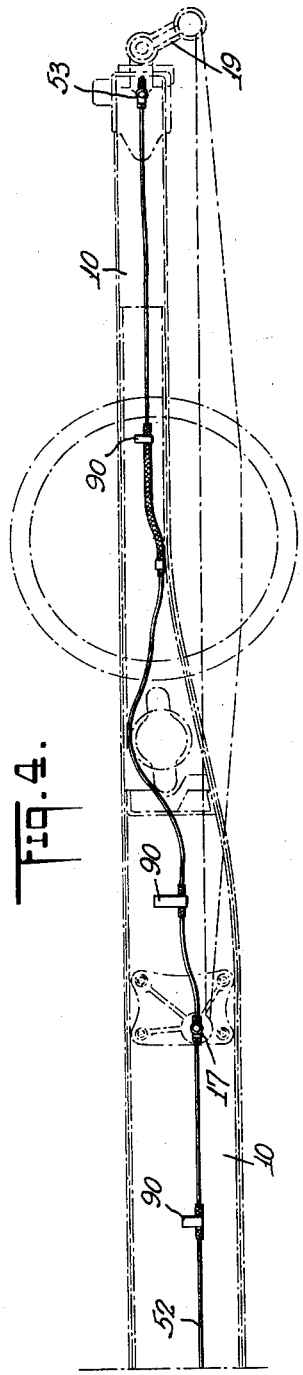
INVENTOR
Joseph Bijur.
BY
Dean, Fairbank, Hirsch & Foster
his ATTORNEYS Patented June 5, 1934

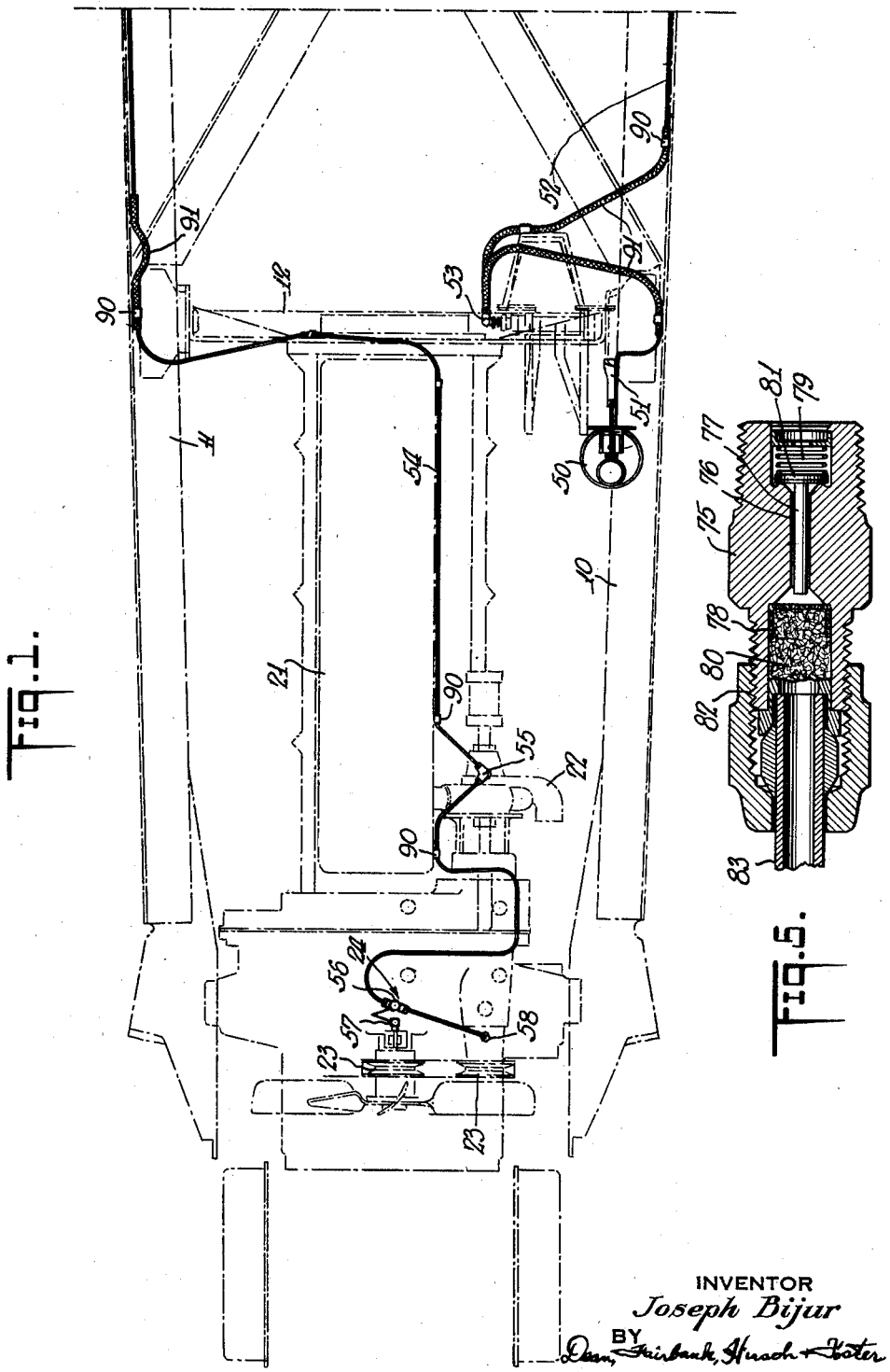

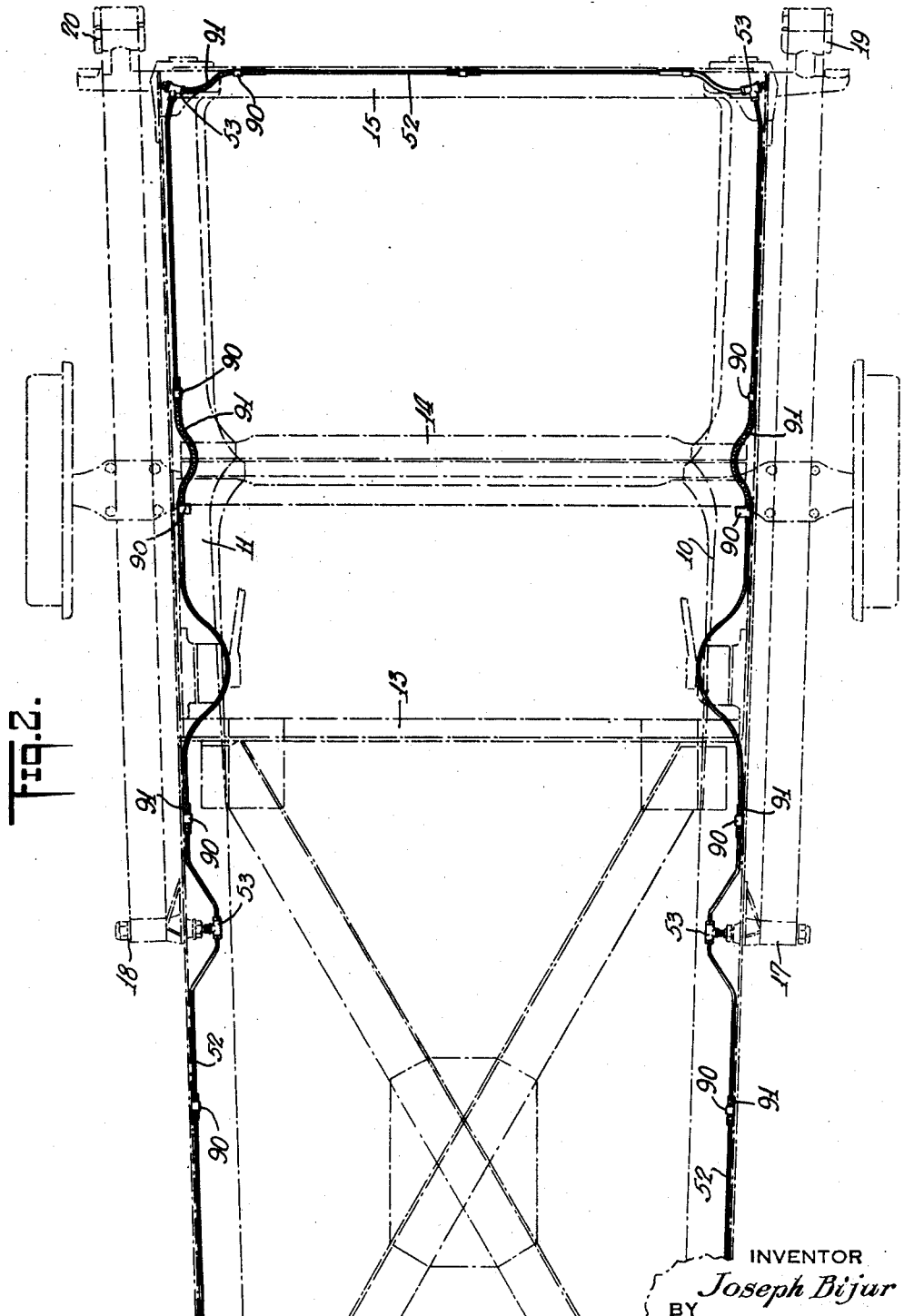

1,961,190

UNITED STATES PATENT OFFICE 1,961,190

LUBRICATION

Joseph Bijur, New York, N. Y., assignor to Auto Research Corporation, a corporation of Delaware Application January 6, 1931, Serial No. 506,853

14 Claims. (Cl. 184—7)

This invention relates to lubrication and is concerned with central lubricating systems particularly adapted for automotive or other vehicles.

Among the objects of the invention are to provide a central automobile chassis lubricating system, which will proportion lubricant satisfactorily among a plurality of bearings despite wide variations between winter and summer operation in the viscosity of the lubricant in the chassis lines, and which will accomplish this result even though some particular bearing or bearings be maintained throughout said systems at elevated temperatures varying far less widely than the temperature of the other chassis bearings.

Another object is to provide a central chassis lubricating system for an automotive vehicle which is adapted to supply a plurality of bearings supported upon or adjacent to the engine structure in addition to supplying the usual chassis bearings, which system is particularly adapted to front drive vehicles.

Another object is to provide a distributing system of simple construction by which the feed of lubricant to bearings which would tend to receive an over-supply of lubricant due to high temperature thereof for instance are nevertheless supplied with their requisite small amounts of oil and by the use of drip plugs of inexpensive comparatively coarse construction.

Other objects are in part obvious and in part pointed out hereinafter.

A feature of the invention is the use of an elongated lubricant feed conduit preferably exposed to the atmosphere or otherwise maintained at comparatively low temperature and feeding one or more bearings beyond the outlet end thereof which bearings are at relatively elevated temperature or are otherwise of such character as to tend to receive excessive quantities of lubricant from flow restriction metering devices. The relatively cold length of feed pipe will impose a resistance of appreciable magnitude to the flow of lubricant as compared to that of the hot restriction metering devices or drip plugs, even though the latter be of a high degree of restriction, resulting in a retardation of the rate of feed to such drip plugs. The elongated feed line may be provided with relief means in the character of one or more flow restricted drains or drip plugs, maintained at temperature considerably lower than that of the hot bearings, said drain or drip plugs preferably supplying various bearings at lower temperatures than the hot bearings above referred to. These relief means will reduce the lubricant pressure supply before it is applied to the hot bearings.

In a specific application to chassis lubrication the elongated feed conduit extends along the chassis frame and is preferably of length substantially greater than the length of the vehicle along the chassis frame of which it preferably extends, the various drip plug outlets feeding the chassis bearings and being provided in the run and in the ends of said line, the terminal portion of said trunk line having connected in series therewith another trunk line feeding the hot auxiliary bearings associated with the engine.

In the accompanying drawings which are shown one or more of the various possible embodiments of the features of this invention:

Figs. 1 and 2 show, respectively, in top plan view the front and rear ends of the chassis and attached engine with the positioning of the chassis lubricating system thereupon, the hood, wheels and body being removed;

Figs. 3 and 4 are similar side views; and

Fig. 5 is an illustrative view of a typical flow metering device in longitudinal section.

In Figs. 1 to 4 the automobile chassis is shown with side rails 10 and 11 connected by the cross members 12, 13, 14 and 15. The chassis supports the spring hinge bearing structures 17 and 18 and the spring shackle bearing structures 19 and 20, and it also supports the engine 21 with which is associated the water pump 22, the fan 23 and the clutch structure, the housing of which is indicated by the numeral 24.

The lubricating installation applied to this chassis comprises a spring discharged pump 50 illustratively shown with the pedal 51 by which the spring is stressed for automatic discharge of the pump. The main conduit system includes a trunk or main 52 which extends rearwardly along the side frame member 10 transversely along the rear transverse member 15, forwardly along the other side frame member 11 and supplies the drip plugs 53 at the chassis bearing structure including the spring bolt structure 17 and 18 and the spring shackle structure 19 and 20. The subsidiary conduit system includes a trunk or main 54 in series with the main 52 and leads to drip plugs, 55, 56, 57 and 58, supplying, respectively, the bearings of the water pump, the clutch, the fan and the fan drive shaft, which are supported upon and substantially rigid with the engine structure 21.

Although the flow metering devices utilized may take a variety of forms, they may be of the restriction type shown in Fig. 5, in which the body 75 is provided with a central bore 76 nearly filled by a pin 77, the length or diameter of which determines the rating of the device. The body is also provided with inlet and outlet sockets 78 and 79 containing, respectively, a strainer 80 and a check valve 81, which latter is shown spring-seated but may be of the suction-seated type. The inlet end 82 is provided with a suitable arrangement for coupling it to the pipe terminal 83 when at the termination of a conduit, as at 57 or 58, or it may be provided with a junction cap as is the case with the other drip plugs shown.

As shown, the conduit system in addition to being supported by the various junction devices associated with the drip plugs, is also supported by series of clips 90 attached to the chassis or engine structures and is protected at places where subject to wear by the fibrous tubing 91.

In operation, lubricant will reach the engine conduit main 54 only after it has passed through the relatively cold main 52 which supplies the chassis drip plugs 53. As a result the engine main 54 and the drip plugs 55 to 58 associated therewith, being at more elevated temperature and passing lubricant at lower viscosity will not receive a preferential supply of lubricant to the deprivation of the relatively cold chassis bearings 54.

As a rule, the drip plugs or flow metering devices attached to the engine structure are of substantially greater restriction than those positioned at the chassis bearings and if desired, to reduce still further the amount of lubricant supplied to the auxiliary engine bearings, or to effect the desired slow rate of feed at said bearings with the use of drip plugs adapted for higher feed under pump pressure, a master restriction may be inserted between the conduit main 52 and the conduit main 54 and this may take the form of a length of fine bore tubing, as for example, 7 feet or 8 feet of $\frac{1}{16}$ inch or $\frac{1}{32}$ inch bore piping as compared to the normal bore of the remaining pipe of $\frac{1}{8}$ inch or larger. This fine bore tubing may be conveniently positioned, if desired, between the last of the drip plugs 53 in the direction of flow through the chassis main, and the first on the engine main.

By the expression auxiliary engine bearing or bearings as used in the specification and claims is meant those bearings upon or adjacent to and auxiliary to the engine structure and not ordinarily lubricated from the engine lubricating system.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

It is to be understood that the invention as set forth in the accompanying claims is applicable to the lubrication of bearings other than chassis bearings or bearings other than those associated with internal combustion engines and/or with vehicles.

I claim:

1. A central lubricating installation for supplying groups of bearings, one of which is maintained at substantially higher temperature than the other, which comprises a source of lubricant and separate trunk and branch distribution systems for supplying each group of bearings, the trunks of which are in series with each other, said source of lubricant being connected to the system supplying the bearings of lower temperature.

2. A central lubricating installation for supplying a plurality of bearing means, one of which is maintained at substantially higher temperature than the other, which comprises a source of lubricant, a trunk and branch distribution system for supplying the bearing means, said system including flow metering devices for proportioning the lubricant to said bearing means, said system being so arranged that the bearing means at higher temperature will be farthest removed from the source of lubricant.

3. A central lubricating installation for different groups of bearings, one of which is maintained at substantially higher temperature than the other, which comprises a source of lubricant pressure, separate trunk and branch distribution systems for supplying each group and flow restricting means connecting the trunks of said systems in series, said source of lubricant pressure being directly connected to the system adapted to supply the bearings of lower temperature.

4. A central lubricating installation for different groups of bearings, one of which requires substantially less lubricant than the other, which comprises a source of lubricant pressure, separate trunk and branch distribution systems for supplying each group, flow restriction metering devices associated with said system for proportioning the lubricant to said bearings and flow restricting means forming a connection between the trunks of said systems, said source of lubricant pressure being directly connected to the system supplying the bearings requiring the greater quantity of lubricant.

5. A central chassis lubricating installation for a plurality of bearings some of which are positioned closely adjacent to the chassis frame and others of which are positioned upon the engine structure supported upon said chassis frame, comprising a trunk and branch distribution system, the trunk of which first passes the chassis bearings and then passes the engine bearings and flow proportioning instrumentalities associated with the branches for distributing the lubricant among said bearings.

6. A central chassis lubricating installation for a plurality of bearings some of which are positioned closely adjacent to the chassis frame and others of which are positioned upon the engine structure supported upon said chassis frame, comprising a trunk and branch distribution system and drip plugs for supplying said bearings, the conduit system being so arranged as to supply the drip plugs at the engine bearings after supplying the drip plugs at the chassis bearings.

7. A central chassis lubricating system for supplying chassis and auxiliary engine bearings, comprising a source of lubricant pressure, a trunk and branch conduit system upon the chassis, the trunk of which is connected to said source and a trunk and branch conduit system upon the engine, the trunk of which is connected in series to the trunk of the system supplying the chassis bearings.

8. A central chassis lubricating installation for supplying chassis bearings and auxiliary engine bearings, said engine being supported upon a chassis with side longitudinal members and transverse members one of which is positioned at the extreme rear of the chassis, comprising a lubricant pressure means, a conduit running rearwardly along one of said chassis side members from said pressure means, a transverse conduit running between the rear ends of said chassis side members across said transverse member and in series with first mentioned conduit, a third conduit extending forwardly along the other chassis side member in series with said transverse conduit, an engine conduit system in series with said last mentioned longitudinal conduit and flow metering instrumentalities associated with said conduits to supply said bearings.

9. A central lubricating system for supplying auxiliary engine bearings of an automobile, said engine being supported upon a chassis with side longitudinal members and transverse members distributed therealong comprising a lubricant pressure means supported upon the chassis adjacent the engine and adjacent one of the side longitudinal members, a conduit running rearwardly along one of said chassis side members from said pressure means, a transverse conduit running between the rear portions of said chassis side members and supported by a transverse member in series with first mentioned conduit, a conduit extending forwardly along the other chassis side member in series with said transverse conduit, an engine conduit system in series with said last longitudinal conduit and flow metering instrumentalities associated with said conduit to supply said bearings.

10. A central lubricating installation for supplying auxiliary engine bearings, said engine being supported upon a chassis, comprising a lubricant pressure source supported upon said chassis, an elongated conduit exposed to atmospheric temperature extending along said chassis connected at one end to said source, a distributing system supplying said bearings attached to the other end of said conduit removed from said source and flow metering instrumentalities associated with said system to proportion the supply to said bearings.

11. A central lubricating installation for groups of bearings maintained within zones of different temperatures comprising a source of lubricant positioned within a zone of higher temperature and a trunk and branch distribution system supplied therefrom, the end of which is positioned in said high temperature zone to supply bearings therein and the intermediate portions of which are maintained in a low temperature zone to supply bearings therein.

12. A central lubricating installation for different groups of bearings, one of which requires substantially smaller quantities of lubricant than the other, which comprises a source of lubricant pressure, separate trunk and branch distribution systems for supplying each group, said systems including flow metering devices for proportioning the lubricant to said bearings, one of said systems being directly connected to the source and the other feeding the flow metering devices for the group of bearings requiring the least lubricant being connected to said first system and means connected with the trunk and branch distribution systems for reducing the pressure transmitted from said source through said first system to the second system and to the flow metering devices for the group of bearings requiring the least lubricant.

13. A central lubricating installation for chassis and auxiliary engine bearings, said latter bearings being enclosed under an automobile hood, comprising a source of lubricant, a branched distribution system connected to the source at one end and at the other end to said auxiliary engine bearings and flow metering instrumentalities feeding lubricant from said system to said bearings, the ends of said system being under the hood and the intermediate portions extending along the chassis frame, said system being provided with a plurality of outlets connected through said instrumentalities to said bearings, the intermediate portion of the system serving to distribute lubricant to the chassis bearings, and the end of the system connected to said auxiliary engine bearings distributing lubricant among said bearings.

14. A central lubricating installation for supplying auxiliary engine bearings, said engine being supported upon a chassis, comprising a lubricant pressure source supported upon said chassis, an elongated conduit exposed to atmospheric temperature extending along said chassis connected at one end to said source, a distributing system supplying said bearings attached to the other end of said conduit removed from said source and flow metering instrumentalities associated with said system to proportion the supply to said bearings, said elongated conduit being provided with means to reduce the lubricant pressure applied to the engine bearings from said pressure source.

JOSEPH BIJUR.